Feb. 15, 1966 M. J. CAPARONE ETAL 3,235,179
CONTROL DEVICE HAVING TEMPERATURE RESPONSIVE MEANS FOR
REGULATING THE PRESSURE REGULATOR THEREOF
Filed May 23, 1962 4 Sheets-Sheet 1

INVENTORS
MICHAEL J. CAPARONE
HUBERT A. RICH

BY

THEIR ATTORNEY

Feb. 15, 1966 M. J. CAPARONE ETAL 3,235,179
CONTROL DEVICE HAVING TEMPERATURE RESPONSIVE MEANS FOR
REGULATING THE PRESSURE REGULATOR THEREOF
Filed May 23, 1962 4 Sheets-Sheet 2

INVENTORS
MICHAEL J. CAPARONE
HUBERT A. RICH
BY Robert O'Cauan
THEIR ATTORNEY

INVENTORS
MICHAEL J. CAPARONE
HUBERT A. RICH

BY Robert R Candor

THEIR ATTORNEY

Feb. 15, 1966   M. J. CAPARONE ETAL   3,235,179
CONTROL DEVICE HAVING TEMPERATURE RESPONSIVE MEANS FOR
REGULATING THE PRESSURE REGULATOR THEREOF
Filed May 23, 1962   4 Sheets-Sheet 4

INVENTORS
MICHAEL J. CAPARONE
HUBERT A. RICH

BY

THEIR ATTORNEY

United States Patent Office 3,235,179
Patented Feb. 15, 1966

3,235,179
CONTROL DEVICE HAVING TEMPERATURE RESPONSIVE MEANS FOR REGULATING THE PRESSURE REGULATOR THEREOF
Michael John Caparone, Arcadia, and Hubert Allen Rich, Westminster, Calif., assignors to Robertshaw Controls Company, Richmond, Va., a corporation of Delaware
Filed May 23, 1962, Ser. No. 197,077
9 Claims. (Cl. 236—33)

This invention relates to improved control devices for providing variable recovery rates for an appliance or the like.

More specifically, this invention relates to control devices for hot water supply tanks and the like wherein the control device varies the pressure of the fuel delivered to a burner means for the hot water supply tank in response to the temperature of the water in the supply tank.

Heretofore, control devices for controlling the flow of fuel to the burner means of hot water supply tanks have been controlled by manual and thermostatic operations wherein a temperature sensing means is disposed in the hot water supply tank and intermittently operates a valve means which controls the flow of fuel to the burner means to maintain the water in the supply tank at a desired temperature.

However, during certain periods of the day when there is a large demand and a correspondingly large drawoff of hot water from the supply tank, the burner cannot restore the temperature of the water in the tank to the desired value with sufficient rapidity whereby subsequent draws of water are made with water below the desired temperature.

To attempt to avoid this situation, it has been necessary to set the control point temperature of the temperature sensing means at a higher value whereby the supply tank is subjected to higher water temperatures that greatly decrease the life of the supply tank.

According to the teachings of this invention, however, an improved control device is provided which will operate the burner means of the hot water supply tank at normal recovery rates during normal use of the supply tank and will automatically increase the recovery rate when excessive demands are made on the supply tank without subjecting the supply tank to adverse temperatures that would tend to shorten the life of the tank.

In addition, the control device of this invention can be so constructed and arranged that the control device prevents the temperature of the water in the supply tank from overshooting the selected temperature as in prior known devices.

Therefore, it is an object of this invention to provide an improved control device having one or more of the novel features set forth above or hereinafter shown or described.

Other objects, uses and advantages of this invention are apparent from a reading of this description which proceeds with reference to the accompanying drawings forming a part thereof and wherein.

Figure 1:
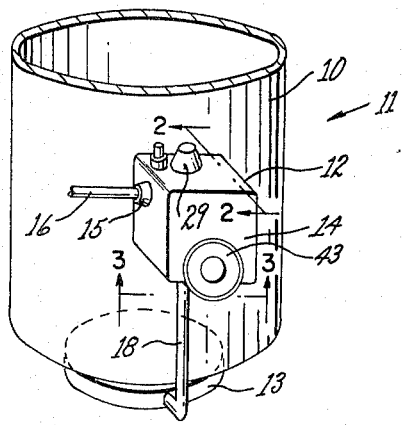
FIGURE 1 is a fragmentary, schematic view illustrating one application of the improved control device of this invention.

While the various features of this invention are hereinafter described and illustrated as being particularly adaptable for controlling the heating means of a hot water supply tank or the like, it is to be understod that the various features of this invention can be utilized singly or in any combination thereof to provide other constructions as desired.

Therefore, this invention is not to be limited to only the embodiments illustrated in the drawings, because the drawings are merely utilized to illustrate one of the wide variety of uses of this invention.

Referring now to FIGURE 1, an improved system for heating water in a hot water supply tank 10 is generally indicated by the reference numeral 11 and comprises an improved control device 12 of this invention adapted to regulate the flow of fuel to a burner means 13 for the hot water supply tank 10 in a manner hereinafter described to automatically provide a normal recovery rate when normal draws are made on the supply tank 10 and to automatically increase the recovery rate when excessive draws are made on the supply tank 10.

In addition, the control device 12 of this invention is adapted to prevent overshooting of the temperature of the water in the supply tank 10 in a manner hereinafter described.

The control device 12 includes a housing 14 formed from a plurality of parts in a manner hereinafter described and has an inlet 15 adapted to be interconnected to a source of fuel by a conduit 16 and has an outlet 17, FIGURE 2, adapted to be interconnected to a conduit 18 leading to the burner means 13.

Figure 3:
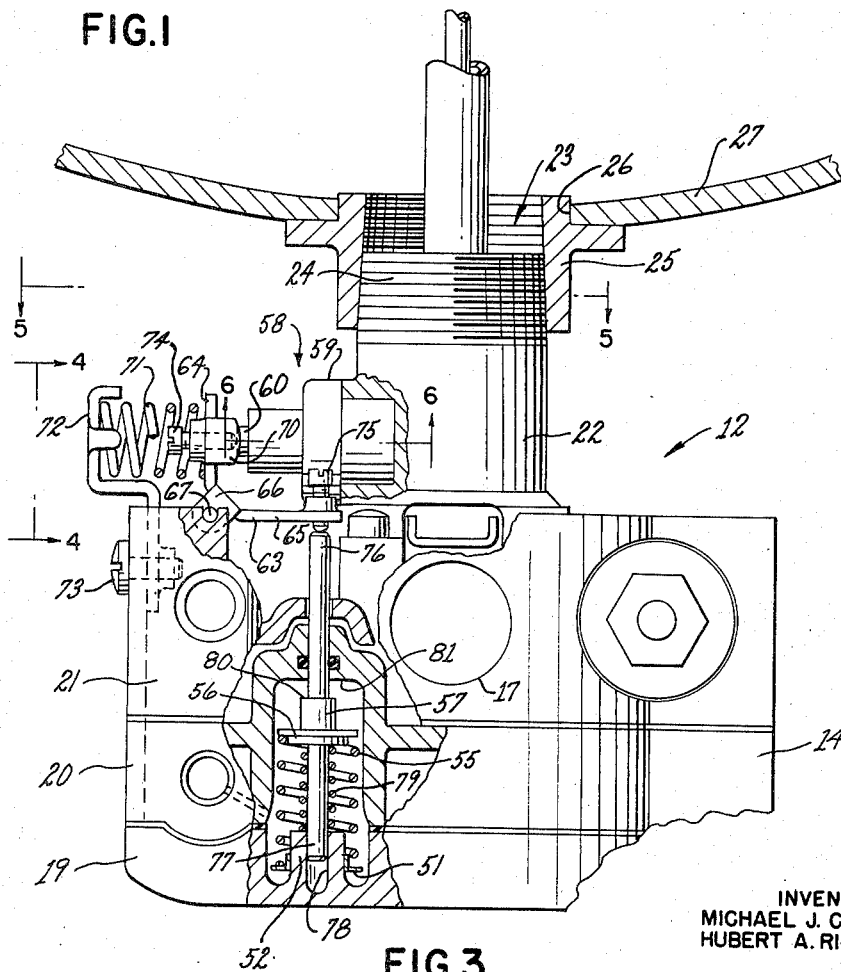
FIGURE 3 is an enlarged, fragmentary, broken-away view taken substantially in the direction of line 3—3 of FIGURE 1.
Figure 2:
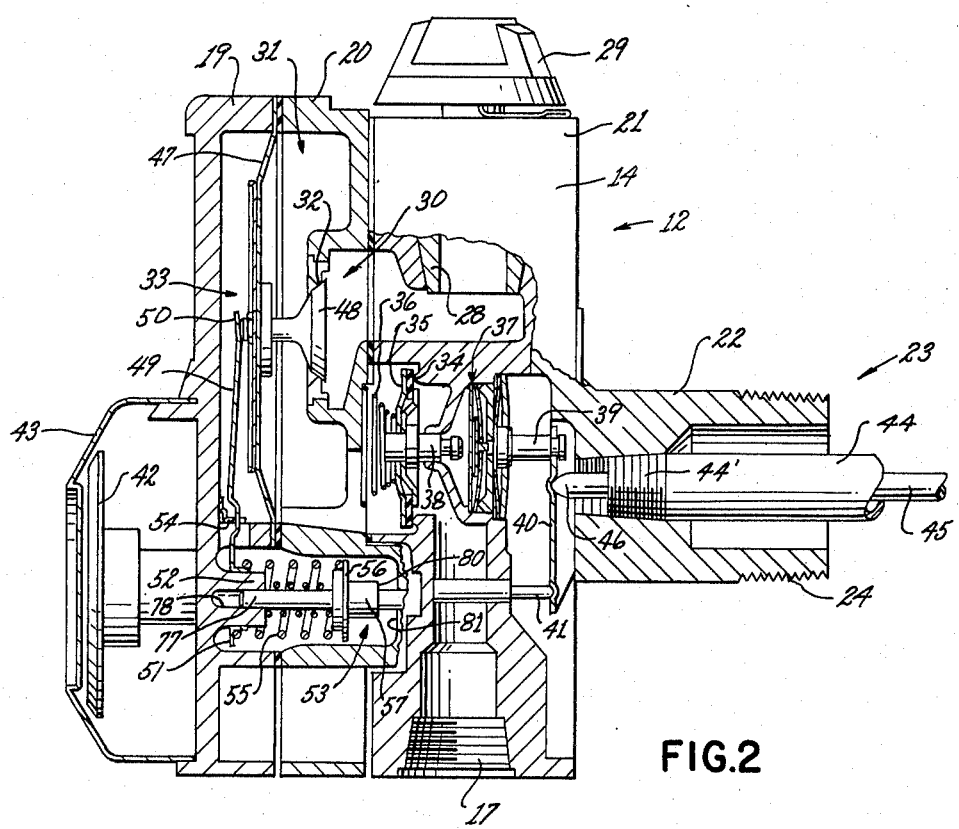
FIGURE 2 is an enlarged fragmentary, partial cross-sectional view taken substantially on line 2—2 of FIGURE 1.

As illustrated in FIGURES 2 and 3, the housing 14 of the control device 12 is formed from a plurality of parts 19, 20, 21 and 22 suitably chambered and interconnected together, the part 22 comprising a shank of a temperature sensing means 23 adapted to support the control device 12 to the supply tank 10 in the manner illustrated in FIGURE 3 wherein the shank 22 has an externally threaded portion 24 threadedly received in a nipple or bushing 25 secured in an aperture 26 in the wall 27 of the supply tank 10 so that the temperature sensing means 23 can have a portion thereof disposed inside the supply tank 10 and engageable by the water contained therein for a purpose hereinafter described.

As illustrated in FIGURE 2, the control device 12 has a gas cock valve 28 adapted to be rotated by an externally mounted control knob 29 to selectively interconnect the inlet 15 with a chamber 30 formed in the housing 14.

The chamber 30 in the housing 14 is separated from another chamber 31 formed in the housing 14 by an annular valve seat 32, the flow of fuel passing from the chamber 30 to the chamber 31 being controlled by a pressure regulator 33 of this invention.

The chamber 31 formed in the housing 14 is interconnected to the outlet 17 by an annular valve seat 34, the annular valve seat 34 being controlled by a valve member or means 35 normally urged to the closed position by a compression spring 36.

While the particular details of the valve means 35 do not form a part of this invention, it will suffice to state that the valve means 35 is moved to an open position when a snap-action member 37 is snapped over center to engage a stem 38 carried by the valve means 35 and move the stem 38 and valve means 35 to the left in opposition to the force of the compression spring 36.

For further information concerning the details and operation of the valve means 35 and snap-action member 37, see the United States Patent to Jackson et al. No. 2,975,974, issued Mar. 21, 1961.

The snap-action member 37 is snapped over center when a plunger 39 is moved to the left a predetermined distance.

A lever 40 is interconnected at one end thereof to the plunger 39 and at the other end thereof to a fulcrum-positioning member 41 whereby the position of the fulcrum member 41 is selectively adjusted by a control knob 42 disposed within a detachable cover member 43.

The temperature sensing means 23 of this invention includes a conventional thermostat tube and rod arrangement wherein a tube 44, having a high coefficient of thermal expansion, has one end 44′ thereof threadedly attached to the shank 22 so that the other free end of the tube 44 moves toward and away from the shank 22 depending upon the temperature of the water sensed by the tube 44 expanding or contracting the tube 44.

A rod 45 is disposed in the tube 44 and has the right end thereof secured to the free end of the tube 44 in any suitable manner whereby the left end 46 of the rod 45 is moved to the left upon a decrease in temperature in the supply tank 10 and is moved to the right upon an increase in temperature in tank 10, the rod 45 having a relatively low coefficient of thermal expansion in relation to the tube 44 whereby the tube 44 and rod 45 form a bimetallic actuator.

The free end 46 of the rod 45 engages the lever 40 intermediate the ends thereof whereby movement of the rod 45 causes movement of the plunger 39 of the snap-action member 37.

The control knob 42 of the control device 12 is so calibrated that the same can select a desired temperature for the water in the hot water supply tank 10. For example, the control knob 42 can be disposed in a position thereof to substantially maintain the water in the supply tank 10 at approximately 155° F.

Depending upon the construction of the snap-action member 37 and the lever 40, the temperature sensing means 33 can cause opening of the valve means 35 upon a predetermined drop of temperature of the water in the supply tank 10 below the selected temperature of 155° F.

For example, the control device 12 can be so constructed and arranged that the valve means 35 will not be opened until the temperature of the water in the supply tank 10 has dropped below 135° F. whereby the free end 46 of the rod 45 has moved to the left a sufficient distance to cause the snap-action member 37 to snap over center and open the valve means 35.

When the valve means 35 is opened in the above manner, fuel is adapted to flow from a source thereof to the burner means 13 wherein automatic pilot means or the like ignites the same and the burning fuel tends to heat the water in the tank 10 to the selected temperature.

However, the snap-action member 37 is so constructed and arranged, that the valve means 35 does not close until the temperature-sensing means 23 senses a temperature of 155° in the hot water supply tank 10.

The pressure-regulating means 33 of this invention is so constructed and arranged in a manner hereinafter described to tend to prevent overshooting of the temperature in the water tank 10 should the burner means 13 be operated in the above manner.

Further, the pressure regulator 33 of this invention is so constructed and arranged that the same is adapted to provide a large recovery rate for the system 11 should the temperature in the water tank 10 drop below the normal operation thereof because of excessive draws thereon in a manner hereinafter described.

As illustrated in FIGURE 2, the pressure regulator 33 comprises a flexible diaphragm 47 having its outer periphery secured between the parts 19 and 20 of the housing 14, the diaphragm 47 carrying a valve member 48 cooperable to open and close the valve seat 32 depending upon the position of the diaphragm 47 in a manner conventional in the art.

A lever 49 has one end 50 thereof bearing against the non-operating side of the diaphragm 47 and has another end 51 thereof telescopically disposed and in sliding engagement with a cylindrical boss 52 of the housing 14 projecting into a suitably vented chamber 53 formed in the housing 14.

The lever 49 is fulcrumed intermediate its ends 50 and 51 against a fulcrum member 54, the end 51 of the lever 49 being urged to the left by a compression spring 55 disposed between the end 51 of the lever 49 and a collar 56 carried on a plunger 57.

Depending upon the position of the collar 56 of the plunger 57 relative to the cylindrical boss 52, the force of the compression spring 55 acting against the end 51 of the lever 49 determines the force tending to move the valve member 48 of the pressure regulator 33 to an open position thereof in opposition to the force of the pressure of the fuel in the chamber 31 acting against the diaphragm 47 to move the valve member 48 to its closed position.

In this manner, by adjusting the force of the compression spring 55, by moving the collar 56 relative to the cylindrical boss 52 in a manner hereinafter described, the lever 49 and diaphragm 47 determines the pressure of the fuel passing from chamber 31 to the outlet 17 for a purpose hereinafter described.

Figure 6:
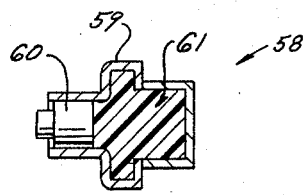
FIGURE 6 is an enlarged, cross-sectional view of the temperature sensing means illustrated in FIGURE 3 and is taken on line 6—6 thereof.

A second temperature sensing means of this invention is generally indicated by the reference numeral 58 in FIGURES 3 and 6 and comprises a cylinder-defining member 59 having a piston 60 disposed therein, the cylinder defining member 59 being filled with a temperature-sensing medium 61, such as wax or the like, whereby an increase in temperature sensed by the temperature-sensing device 58 causes the wax 61 to expand and move the piston member 60 to the left. Conversely, a decrease in temperature sensed by the temperature-sensing means 58 causes the temperature sensing medium 61 to contract whereby the piston 60 is adapted to move to the right.

While one type of temperature-sensing means 58 has been illustrated and described above, it is to be understood that other types of temperature-sensing means may be utilized as desired.

Figure 4:
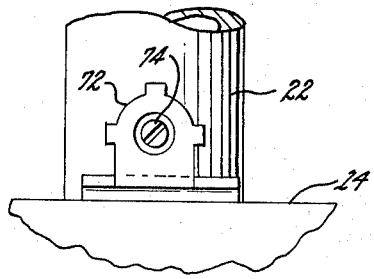
FIGURE 4 is a fragmentary side view taken in the direction of line 4—4 of FIGURE 3.
Figure 5:
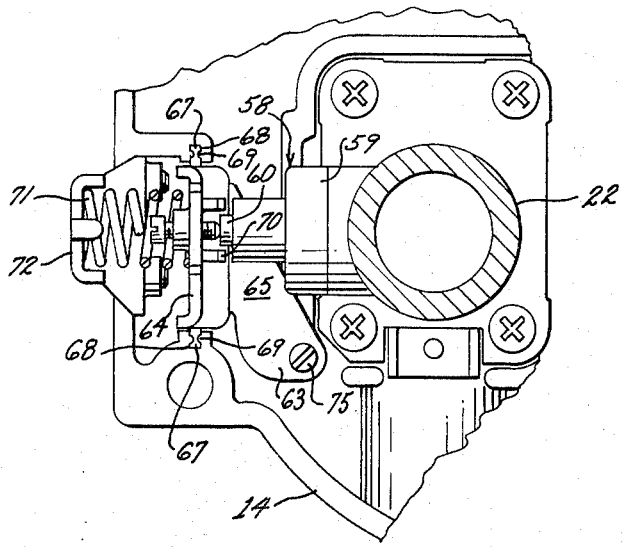
FIGURE 5 is a fragmentary view taken in the direction of line 5—5 of FIGURE 3.

In the embodiment of the invention illustrated in FIGURES 3–5, the temperature-sensing means 58 is mounted in a cavity 62 formed in the shank 22 of the temperature-sensing means 23 at a point thereof disposed outside of the hot water supply tank 10.

However, since the water in the tank 10 engages the shank 22 of the temperature-sensing means 23, the temperature of the shank 22 sensed by the temperature-sensing means 53 is a function of the temperature of the water in the tank 10 for a purpose hereinafter described.

As illustrated in FIGURES 3 and 5, an L-shaped lever 63, being defined by a pair of legs 64 and 65 disposed substantially at right angles relative to each other, has a pair of ears or lugs 66 carrying a pivot pin 67 having opposed ends disposed in slots 68 formed in the housing 14 and staked therein at 69 whereby the lever 63 is adapted to pivot about the pivot pin 67.

The leg 64 of the levers 63 carries a pair of inwardly directed ears or lugs 70 adapted to engage the cylinder-defining member 59 of the temperature-sensing means 58 when the lever 63 is rotated in a clockwise direction under the force of a compression spring 71 disposed between the leg 64 of the lever 63 and a retainer 72 secured to the housing 14 by threaded fastening means 73.

In this manner, an adjusting screw 74 is carried by the leg 64 of the lever 63 and is adapted to engage the piston 60 of the temperature-sensing means 58.

Thus, when the temperature-sensing medium 61 of the temperature-sensing device 58 contracts to permit the compression spring 71 to pivot the lever 63 in a clockwise direction, the ears 70 of the leg 64 of the lever 63 limit the degree of clockwise movement of the lever 63 as the same engage against the cylinder defining member 59 to prevent further clockwise movement of the lever 63 even though the piston 60 is adapted to be further moved to the right upon further contracting of the temperature-sensing medium 61.

The leg 65 of the lever 63 carries an adjusting screw 75 adapted to engage the upper end 76 of the plunger 57 previously described.

The lower end 77 of the plunger 57 is telescopically received in a bore 78 formed in the cylindrical boss 52 of the housing 14 whereby movement of the plunger 57 is limited to axial movement thereof.

A compression spring 79 is disposed inside the compression spring 75 previously described, the compression spring 79 having one end thereof engaging the cylindrical boss 52 and the other end engaging the collar 56 of the plunger 57 whereby the force of the compression spring 79 tends to move the collar 56 of the plunger 57 away from the cylindrical boss 52 to decrease the force of the compression spring 55 acting on the lever 49 and, thus, lower the rate of flow of fuel passing through the pressure regulator 33.

The amount of movement of the collar 56 away from the cylindrical boss 52 is limited by an annular shoulder 80 of the plunger 57 engaging a housing portion 81 through which the end 76 of the plunger 57 sealably extends.

Therefore, it can be seen that as the temperature sensed by the temperature-sensing means 58 of this invention increases, the temperature-sensing medium 61 expands to move the piston 60 to the left in opposition to the force of the compression spring 71 to tend to move the lever 63 in a counterclockwise direction whereby the force of the compression spring 79 is adapted to move the plunger 57 away from the cylindrical boss 52 of the housing 14 to decrease the force of the compression spring 55 and, thus, decrease the rate of flow of fuel through the pressure regulator 33.

Conversely, a decrease in the temperature sensed by the temperature-sensing means 58 causes the temperature-sensing medium 61 to contract, whereby the force of the compression spring 71 is adapted to move the lever 63 in a clockwise direction to cause the plunger 57 to move toward the cylindrical boss 52 and increase the force of the compression spring 55, whereby the rate of flow of fuel through the pressure regulator 33 is increased.

Therefore, it can be seen that when the piston 60 of the temperature-sensing means 58 has been moved to the left a distance sufficient to permit the annular shoulder 80 of the plunger 57 to abut against the housing 81 under the force of the compression spring 79, the pressure regulator 33 is set at its normal position to provide a minimum flow of fuel through the valve seat 32 of the pressure regulator 33.

Conversely, when the piston 60 of the temperature-sensing means 58 is moved to the right to permit the ears 70 of the lever 63 to abut against the cylinder-defining member 59, the collar 56 of the plunger 57 is moved the closest to the cylindrical boss 52 of the housing 14, whereby the pressure regulator 33 is set at the maximum position thereof to provide the maximum flow of fuel through the valve seat 32 of the pressure regulator 33.

The operation of the control device 12 will now be described when it is desired to have the temperature-sensing means 58 prevent overshooting of the temperature of the water in the supply tank 10 from the desired temperature thereof.

While certain dimensions and temperatures are hereinafter given in regard to the operation of the control device 12, it is to be understood that the same are merely given by the way of example rather than limitation.

First, assume that the control knob 42 of the control device 12 is set so that the valve means 35 will close when the temperature sensing means 23 senses a temperature of 155° F. in the hot water supply tank 10. Further, assume that the temperature-sensing means 23 has a temperature differential of approximately 20° F., which will result in the valve means 35 being snapped to its open position when the temperature-sensing means 23 senses a temperature of approximately 135° F.

In addition, assume that the shank temperature being sensed by the temperature-sensing means 58 is approximately 15° F. to 30° F. below the water temperature in tank 10, such temperature differential being dependent on heating rate, operating temperature, and the like.

For this example, also assume that the temperature-sensing means 58 has its maximum movement of the piston 60 occurring between 115° F. and 135° F., whereby the piston 60 is essentially contracted at 115° F., fully expanded at 135° F. and providing movement of the piston 60 of approximately 0.160 of an inch during such temperature range.

When hot water has been drawn from the supply tank 10 and replaced by cold water therein in a conventional manner to reduce the temperature of the water in the supply tank 10 to approximately 135° F., the temperature-sensing means 23 opens the valve means 35 to interconnect the source of fuel with the burner means 13.

At this "on" temperature of the water in the tank 10, the temperature-sensing means 58 of this invention senses a shank temperature of approximately 115° F., whereby the piston 60 will be disposed in its fully contracted position to cause the tabs 70 of the lever 63 to be in contact with the end of the cylinder-defining member 59, so that the collar 56 of the plunger 57 is disposed in its closest position to the cylindrical boss 52 of the housing 14 to cause the pressure regulator 33 to have a maximum flow of fuel to flow therethrough to the burner 13 and, thus, provide a maximum recovery rate thereof.

Under this condition, a maximum outlet pressure adjustment is provided, delivering a relatively high orifice pressure to the water heater burner means 13, resulting in a relatively high recovery rate.

If it is desired to adjust the maximum outlet pressure provided by the lever 63 when the ears 70 are disposed against the end of the cylinder-defining member 59, the adjusting screw 75 can be rotated in the proper direction to change the maximum setting of the pressure regulator 33.

As the burner means 13 is operated in the above manner to heat the water in the hot water supply tank 10, the valve means 35 remains open, as the temperature of the water increases from 135° F. to 155° F.

However, as the temperature of the water in the tank 10 increases from 135° F. to 155° F., the temperature of the shank 22 sensed by the temperature-sensing means 58 increases from 115° F. to 135° F., whereby the temperature-sensing medium 61 expands to cause the piston 60 to move approximately 0.160 of an inch to the left. This leftward movement of the piston 60 causes the lever 63 to progressively move in a counterclockwise direction to progressively decrease the force of the compression spring 55 tending to open the valve member 48 so that the rate of flow of fuel through the pressure regulator 33 gradually reduced from its maximum position to its minimum position as the temperature of the water in the water heater tank 10 approaches 155° F.

The point at which the piston 60 of the temperature-sensing means 58 contacts the adjusting screw 74 to cause such counterclockwise rotation of the lever 63 is dependent upon the position of the adjusting screw 74 relative to the ends of the ears 70.

Therefore, adjustment of the screw 74 towards or away from the piston 60 determines the temperature at which the regulator pressure setting of the pressure regulator 33 starts to be lowered from its maximum value.

For example, setting of the adjusting screw 74 to contact the end of the piston 60 of the temperature-sensing means 58 after an initial movement of the piston 60 of approximately 0.035 of an inch means that the initial movement of the lever 33 occurs at a shank temperature of approximately 120° F., which is equivalent to a water temperature of approximately 140° F. The regulator pressure of the control device 12 would therefore be at its maximum value when the water temperature in the tank is at 140° F. or below, providing maximum recovery up to this point.

After the water temperature has risen above 140° F. and the shank temperature has risen to above 120° F., the regulator pressure is progressively reduced as the temperature-sensing medium 61 of the temperature-sensing means 58 expands until, at a shank temperature of approximately 135° F., which occurs at a water temperature of approximately 155° F., the piston 60 is moved a total of approximately 0.160 of an inch and has moved the upper arm 64 of the lever 63 approximately 0.125 of an inch.

As the lever ratio of the lever 63 is 1 to 1½, this results in a movement of the plunger 57 of approximately 0.1875 of an inch.

This movement of the plunger 57 results in a reduction of the regulated outlet pressure from its maximum to a minimum when the water has reached the "Off" temperature setting of approximately 155° F. and provides a progressively lower input of fuel to the burner means 13, as the "Off" temperature is approached to thereby prevent overshoot of the "Off" temperature of the water in the hot water supply tank 10.

The minimum setting of the pressure regulator 33 is restricted by the shoulder 80 of the plunger 57 abutting against the wall 81 of the housing 13 should further counterclockwise movement of the lever 63 be effected due to variations in the amount of movement of the piston 60 of the temperature-sensing means 58 or by variations in the settings of the adjusting screw 74. This additional travel of the lever 63 in a counterclockwise direction is taken up by the compression spring 71 without additional travel of the plunger 57 and the adjusting screw can lose contact with the top end 76 of the plunger 57 under these conditions.

Movement to increase the pressure setting of the pressure regulator 33 is caused by the compression spring 71 overcoming the combined forces of the regulator spring 55 and the return spring 79.

Movement to decrease the regulated pressure setting of the pressure regulator 33 is caused by the temperature-sensing means 58 overcoming the force of the compression spring 71 and causing movement of the lever 63 in a counterclockwise direction to allow the return spring 79 to move the plunger 57 upwardly, as shown in FIGURE 3, to thereby reduce the force of the regulating spring 55 acting on the lever 49.

While the temperature-sensing means 58 of this invention has just been described as operating during the normal use of the hot water supply tank 10 to prevent overshooting of the temperature thereof as the temperature approaches the "Off" temperature setting, it is to be understood that the temperature-sensing means 58 of this invention can be utilized in a manner to provide a maximum setting of the pressure regulator 33 only during abnormal uses of the supply tank 10 caused by excessive draws thereon over the normal draws encountered by the supply tank 10.

For example, the temperature-sensing means 58 can be calibrated in such a manner to actuate over a relatively lower range of temperatures, so that in the normal range of the temperature differential of the temperature-sensing means 23, the temperature-sensing means 58 is always in an expanded condition, delivering a pre-set normal or minimum outlet pressure through the pressure regulator 33.

In the case of a severe draw of water on the supply tank 10, causing the water temperature in the supply tank 10 to drop below the "On" point of the temperature-sensing means 23, the temperature-sensing means 58 would then be in its operating range and as it is contracted, the temperature-sensing means 58 would provide progressively higher outlet pressure settings of the pressure regulator 33 until the pre-set maximum outlet pressure thereof is reached.

In this example, the control device 12 would provide a relatively minimum or normal burner input when the water temperature range of the water in the supply tank 10 remained within the temperature differential range of the temperature-sensing means 23.

In the case of a high demand for hot water and a resultant drop in water temperature in the tank 10, the regulated outlet pressure of the control 12 would be progressively increased to a pre-set maximum, resulting in a progressively increasing input and higher recovery rate.

Accordingly, it can be seen that the control device 12 of this invention is adapted to vary the recovery rate of a burner means for a hot water supply tank or the like by utilizing a temperature-sensing means sensing the temperature of a part of the housing of the control device, the part of the housing having a temperature which is a function of the temperature of the water in the supply tank and, in the embodiment illustrated in FIGURES 3–5, the part of the housing comprising part of a temperature-sensing means.

Figure 7:
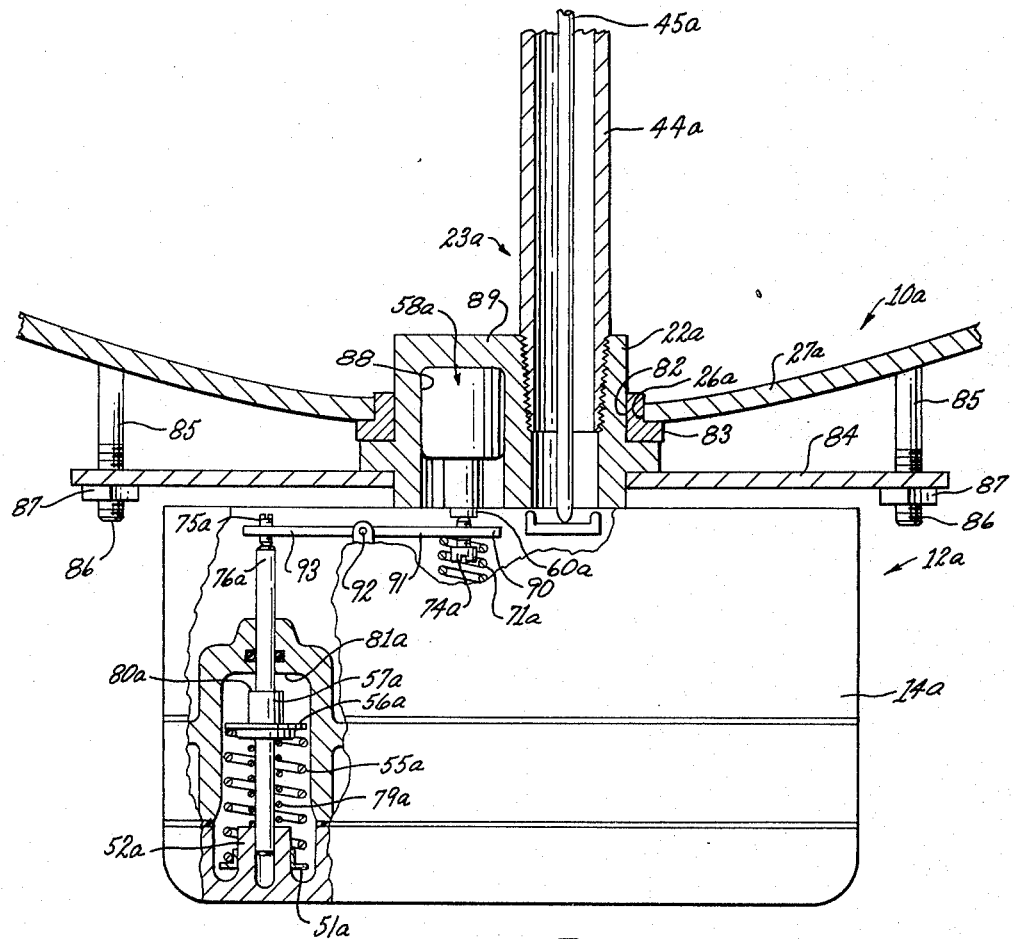
FIGURE 7 is a view similar to FIGURE 3 illustrating another embodiment of this invention.

Another embodiment of this invention is generally indicated by the reference numeral 12a in FIGURE 7, wherein parts thereof similar to the control device 12 are indicated by like reference numerals followed by the reference letter "a."

As illustrated in FIGURE 7, the control device 12a includes the temperature-sensing means 23a, adapted to support the control device 12a relative to the wall 27a of the hot water supply tank 10a, the shank portion 22a of the temperature-sensing means 23a being received in a bore 82 formed in an unthreaded nipple 83 secured in the aperture 26a of the supply tank 10a.

The control device 12a is further supported relative to the supply tank 10a by a plate-like member 84 secured to the shank 22a in any suitable manner and abutting against outwardly directed ears or lugs 85 appropriately secured to the exterior surface of the wall 27a of the tank 10a and having threaded ends 86 passing through suitable bores in the plate 84 and secured thereto by nuts 87.

The shank 22a of the control device 12a has a cavity 88 formed therein to define an end wall 89 engageable by the water in the supply tank 10a.

The temperature-sensing means 58a is disposed in the cavity 88 and has the plunger or piston 60a thereof adapted to abut the adjusting screw 74a carried by one end 90 of a lever 91 pivotally mounted to the housing 14a by a pivot pin 92, the adjusting screw 74a tending to be held in contact with the piston 60a by the compression spring 71a.

The other end 93 of the lever 91 carries an adjusting screw 75a adapted to abut the upper end 76a of the plunger 57a, the plunger 57a varying the force of the compression spring 55a in the manner previously described in regard to the control device 12.

Therefore, it can be seen that in the embodiment illustrated in FIGURE 7, the temperature-sensing means 58a senses the temperature of the shank 22a at a portion thereof having a temperature similar to the temperature of the water in the tank 10a, because merely the end wall 89 of the shank 22a separates the temperature-sensing device 58a from the water in the tank 10a.

Figures 8, 9:
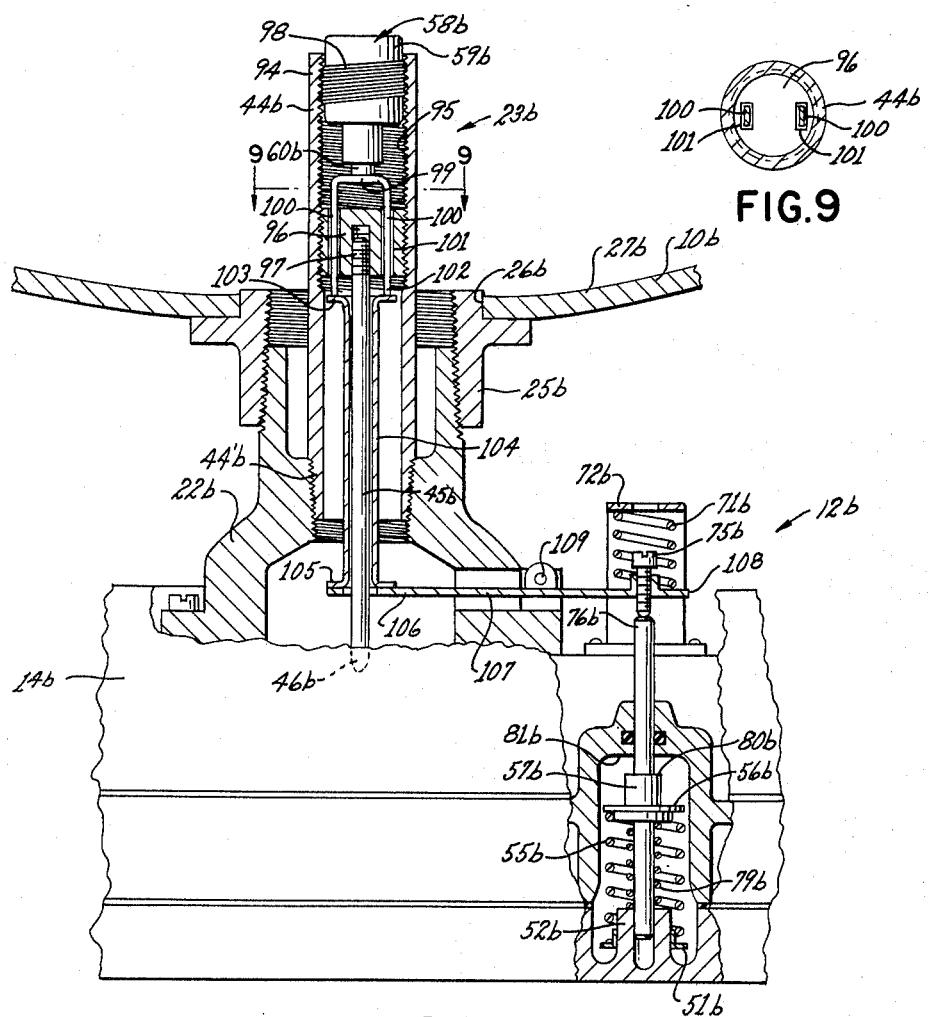
FIGURE 8 is a fragmentary view similar to FIGURE 7 and illustrates still another embodiment of this invention.
FIGURE 9 is a cross-sectional view taken on line 9—9 of FIGURE 8.

Another control device of this invention is illustrated in FIGURES 8 and 9 and is generally indicated by the reference numeral 12b, the parts of the control device 12b that are similar to the parts of the control device 12 are indicated by like reference numerals followed by the reference letter "b."

As illustrated in FIGURE 8, the housing 14b of the control device 12b includes a temperature-sensing means 23b comprising a shank portion 22b threadedly secured in the nipple 25b disposed in the aperture 26b of the wall 27b of the supply tank 10b.

In addition, the temperature-sensing means 23b includes the tube 44b having the end 44b' thereof secured in the shank 22b and a free end 94 disposed in the interior of supply tank 10b.

The free end 94 of the tube 44b is internally threaded at 95 to receive a threaded insert 96 threadedly carrying an end 97 of the rod 45b whereby the end 97 of the rod 45b is connected to the free end 94 of the tube 44b, so that the free end 46b of the rod 45b is moved relative to the housing 14b upon expansion and contraction of the tube 44b in the manner previously described.

The temperature-sensing means 58b of the control device 12b is carried by the free end 94 of the tube 44b, the cylinder-defining member 59b of the temperature-sensing means 58b is exteriorly threaded at 98 to attach the same to the threads 95 of the tube 44b.

The piston 60b of the temperature-sensing means 58b engages a plate 99 having a pair of depending legs 100 respectively passing through slots 101 in the threaded insert 96, so that the free ends 102 of the legs 100 can abut against an annular shoulder 103 of a tubular member 104 telescopically disposed about the rod 45b.

The tubular member 104 has an annular flange 105 at the other end thereof adapted to engage an end 106 of a lever 107, the end 106 of the lever 107 being substantially U-shaped to surround part of the rod 45b, so that the lever 107 does not impede movement of the rod 45b.

The lever 107 is pivoted intermediate its ends 106 and 108 by a pivot pin 109 carried by the housing 14b, the end 108 of the lever 107 carrying an adjusting screw 75b adapted to engage the upper end 76b of the plunger 57b utilized in a manner previously described to vary the force of the compression spring 55b and, thus, to vary the setting of the pressure regulator of the control device 12b.

The adjusting screw 75b of the lever 107 is tended to be moved into engagement with the upper end 76b of the plunger 57b by a compression spring 71b disposed between the end 108 of the lever 107 and a retainer 72b carried by the housing 14b.

Therefore, it can be seen that the temperature-sensing means 58b of this invention is engageable by the water in the tank 10b, whereby the temperature-sensing means 58b not only senses the temperature of the water in the tank 10b but also the temperature of the free end 94 of the tube 54b, which is disposed in the water in the tank 10b. In this manner, the temperature-sensing means 58b, in effect, senses the temperature of the temperature-sensing means of the control device 12b in much the same manner that the temperature-sensing means 58 and 58a of the other embodiments of this invention respectively sense the temperature of the temperature-sensing means 23 and 23a.

In the operation of the control device 12b of this invention, it is to be understood that the amount of movement of the piston member 60b of the temperature-sensing means 58b far exceeds the amount of movement of the free end 94 of the tube 44b during the same change in temperature of the temperature-sensing means 58b and the tube 44b.

In this manner, even though the tube 44b is contracting due to a decrease in temperature of the water in the tank and tending to move the temperature-sensing means 58b downwardly as illustrated in FIGURE 8 to decrease the pressure of the fuel flowing to the main burner means, the piston 60b moves upwardly to a greater extent to actually increase the pressure of the fuel.

Conversely, when the temperature of the water in the tank 10b increases the free end 94 of the tube 44b moves upwardly and carries the temperature-sensing means 58b therewith in a direction tending to increase the pressure of the fuel. However, the piston 60b of the temperature-sensing means 58b moves downwardly to a greater extent to actually decrease the pressure of the fuel.

Therefore, even though the temperature-sensing means 58b moves with the tube 44b, the temperature-sensing means 58b provides the desired pressure setting variations throughout the entire operating range of the control device 12b.

Thus, it can be seen that this invention provides various embodiments of control devices particularly adaptable for water heater systems and the like, wherein the control devices can be utilized to vary the rate of flow of fuel to the burner means of the water heater tanks in accordance with the function of the temperature of the water in the tanks 10 to prevent overshooting of the "Off" temperatures thereof, as well as to provide high recovery rates when the temperature of the water in the tanks is below a predetermined temperature and to provide normal or minimum flow of fuel to the burners when the temperature of the water is in the normal operating temperature of the water in the supply tanks.

While the form of the invention now preferred has been disclosed as required by the statutes, other forms may be used, all coming within the scope of the claims which follow.

What is claimed is:

1. A device for controlling the heating of a water tank or the like and comprising a housing having an inlet adapted to be interconnected to a source of fuel and having an outlet adapted to be interconnected to a burner means for said water tank, a valve means disposed between said inlet and said outlet to control the flow of fuel through said device, a first temperature sensing means carried by said housing and operatively interconnected to said valve means to control said valve means in response to the temperature of said water in said tank, a pressure regulator carried by said device to control the pressure of the fuel flowing therethrough, and a second temperature sensing means operatively interconnected to said pressure regulator to control said pressure regulator in response to temperatures sensed by said second temperature sensing means, said second temperature sensing means including a piston and cylinder arrangement wherein said piston is moved relative to said cylinder upon an increase in temperature, said second temperature sensing means directly sensing the temperature of said first temperature sensing means not the temperature of said tank or the water in said tank.

2. A device for controlling the heating of a water tank or the like and comprising a housing having an inlet adapted to be interconnected to a source of fuel and having an outlet adapted to be interconnected to a burner means for said water tank, a valve means disposed between said inlet and said outlet to control the flow of fuel through said device, a temperature sensing means carried by said housing and operatively interconnected to said valve means to control said valve means in response to the temperature of said water in said tank, a pressure regulator carried by said device to control the pressure of the fuel flowing therethrough, and a second temperature sensing means carried by said first-named temperature sensing means and operatively interconnected to said pressure regulator to control said pressure regulator.

3. A device as set forth in claim 2 wherein said first-named temperature sensing means has a portion thereof adapted to be disposed outside said tank and said second temperature sensing means senses the temperature of said portion of said first-named temperature sensing means.

4. A device as set forth in claim 2 wherein said first-named temperature sensing means has a wall engageable by the water in said tank and said second temperature sensing means senses the temperature of said wall of said first-named temperature sensing means.

5. A device as set forth in claim 2 wherein said first-named temperature sensing means has a portion adapted to be disposed in said tank and said second temperature sensing means is carried by said portion of said first-named temperature sensing means and senses the temperature of said water.

6. A device for controlling the heating of a water tank or the like and comprising a housing having an inlet adapted to be interconnected to a source of fuel and having an outlet adapted to be interconnected to a burner means for said water tank, a valve means disposed between said inlet and said outlet to control the flow of fuel through said device, a first temperature sensing means carried by said housing and operatively interconnected to said valve means to control said valve means in response to the temperature of said water in said tank, said first temperature sensing means including a shank portion adapted to be interconnected to said tank and a tube and rod arrangement carried by said shank portion, a pressure regulator carried by said device to control the pressure of the fuel flowing therethrough, and a second temperature sensing means carried by said first temperature sensing means and operatively interconnected to said pressure regulator to control said pressure regulator.

7. A device as set forth in claim 6 wherein said second temperature sensing means senses the temperature of said shank portion at a point outside said tank.

8. A device as set forth in claim 6 wherein said shank portion has a wall engageable by the water in said tank and said second temperature sensing means senses the temperature of said wall of said shank portion.

9. A device as set forth in claim 6 wherein said tube has a portion thereof adapted to be disposed in said tank and said second temperature sensing means is carried by said portion of said tube and senses the temperature of said water.

References Cited by the Examiner
UNITED STATES PATENTS

| | | | |
|---|---|---|---|
| 1,572,969 | 2/1926 | Schwimmer. | |
| 2,312,479 | 3/1943 | Ray | 236—21 |
| 2,532,896 | 12/1950 | Dillman | 236—99 |
| 2,664,246 | 12/1953 | Ray | 236—99 |
| 2,749,043 | 6/1956 | Eskin | 236—21 |
| 2,784,913 | 3/1957 | Wasson | 236—92 |
| 2,924,387 | 2/1960 | Hajny | 236—1 |
| 3,080,118 | 3/1963 | McCarthy | 236—32 |

WILLIAM F. O'DEA, *Acting Primary Examiner.*

ALDEN D. STEWART, EDWARD J. MICHAEL,
*Examiners.*